United States Patent
Sakurai et al.

(10) Patent No.: US 12,504,622 B2
(45) Date of Patent: Dec. 23, 2025

(54) OPTICAL SCANNING DEVICE

(71) Applicant: STANLEY ELECTRIC CO., LTD., Tokyo (JP)

(72) Inventors: Makoto Sakurai, Tokyo (JP); Yoshifumi Takao, Tokyo (JP); Katsunori Nakazawa, Tokyo (JP); Naoya Matsumaru, Tokyo (JP); Atsushi Yamamoto, Tokyo (JP); Nazirul Afham Idris, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 264 days.

(21) Appl. No.: 18/273,457

(22) PCT Filed: Jan. 24, 2022

(86) PCT No.: PCT/JP2022/002450
§ 371 (c)(1),
(2) Date: Jul. 20, 2023

(87) PCT Pub. No.: WO2022/176516
PCT Pub. Date: Aug. 25, 2022

(65) Prior Publication Data
US 2024/0103263 A1    Mar. 28, 2024

(30) Foreign Application Priority Data

Feb. 22, 2021   (JP) ................. 2021-026244

(51) Int. Cl.
*G02B 26/08*   (2006.01)
*G02B 26/10*   (2006.01)

(52) U.S. Cl.
CPC ............... *G02B 26/105* (2013.01)

(58) Field of Classification Search
CPC ............. G02B 26/105; G02B 26/0833; G02B 26/101; G02B 2027/0178; G02B 27/0172
See application file for complete search history.

(56) References Cited

U.S. PATENT DOCUMENTS 5,347,121 A   9/1994  Rudeen
6,002,507 A   12/1999 Floyd et al.
(Continued)

FOREIGN PATENT DOCUMENTS

CN   109437088 A    3/2019
JP   2006194973 A   7/2006
(Continued)

OTHER PUBLICATIONS

International Search Report (ISR) (and and English language translation thereof) dated Apr. 12, 2022, issued in International Application No. PCT/JP2022/002450.

(Continued)

*Primary Examiner* — Euncha P Cherry
(74) *Attorney, Agent, or Firm* — Holtz, Holtz & Volek PC

(57) ABSTRACT

An optical scanning device includes a standing plate part which has an inclined groove and a through hole at positions above a vertical cavity surface emitting laser (VCSEL) and a micro electro mechanical systems (MEMS) optical deflector, and which is fixed to a substrate. A plate-shaped mirror and a rotary mirror have one end portions thereof in the Y-axis direction supported by the inclined groove and the through hole, respectively. The through hole has the shape of a rotating body having an axis in the Y-axis direction as the centerline thereof.

12 Claims, 9 Drawing Sheets

(56) References Cited

U.S. PATENT DOCUMENTS

| | | | |
|---|---|---|---|
| 6,014,240 A * | 1/2000 | Floyd | G02B 26/10 |
| | | | 359/224.1 |
| 6,715,685 B2 | 4/2004 | Dvorkis | |
| 7,428,995 B1 | 9/2008 | Stern et al. | |
| 8,228,608 B2 | 7/2012 | Yamamoto | |
| 9,097,895 B2 | 8/2015 | Kegami | |
| 10,341,607 B2 | 7/2019 | Komatsu et al. | |
| 2002/0170967 A1 | 11/2002 | Dvorkis | |
| 2004/0240205 A1 | 12/2004 | Hayakawa et al. | |
| 2008/0049289 A1 | 2/2008 | Urakawa et al. | |
| 2010/0149073 A1 | 6/2010 | Chaum et al. | |
| 2011/0211260 A1 | 9/2011 | Yamamoto | |
| 2012/0300276 A1 | 11/2012 | Ohnishi | |
| 2014/0146394 A1 | 5/2014 | Tout et al. | |
| 2019/0004325 A1 | 1/2019 | Connor | |
| 2019/0353897 A1 | 11/2019 | Suzuki et al. | |
| 2019/0370450 A1 | 12/2019 | Fletcher et al. | |

FOREIGN PATENT DOCUMENTS

| | | | |
|---|---|---|---|
| JP | 2009244869 A | 10/2009 | |
| JP | 2010117542 A | 5/2010 | |
| JP | 2010175677 A | 8/2010 | |
| JP | 2012208157 A | 10/2012 | |
| JP | 2013029700 A | 2/2013 | |
| JP | 2013046143 A | 3/2013 | |
| JP | 2014056020 A | 3/2014 | |
| JP | 2015022158 A | 2/2015 | |
| JP | 2017207630 A | 11/2017 | |
| JP | 2018116219 A | 7/2018 | |
| JP | 2019211705 A | 12/2019 | |
| JP | 6734532 B2 | 7/2020 | |
| KR | 100648929 B1 | 11/2006 | |
| WO | 03019463 A1 | 3/2003 | |

OTHER PUBLICATIONS

Written Opinion dated Apr. 12, 2022, issued in International Application No. PCT/JP2022/002450.

International Search Report (ISR) (and English translation thereof) dated Apr. 12, 2022, issued in International Application No. PCT/JP2022/002452.

Written Opinion dated Apr. 12, 2022, issued in International Application No. PCT/JP2022/002452.

Related U.S. Appl. No. 18/277,084, First Named Inventor: Makato Sakurai,; Title: "Eyeglass-Type Video Display Device"; filed: Aug. 14, 2023.

Supplementary European Search Report (SESR) dated Nov. 26, 2024, issued in European Application No. 22804485.5 (which is a counterpart of related U.S. Appl. No. 18/562,009).

International Search Report (ISR) (and English translation thereof) dated Jun. 21, 2022, issued in International Application No. PCT/JP2022/018040.

Related U.S. Appl. No. 18/290,291, First Named Inventor: Atsushi Yamamoto; Title: "Optical Scanning Device and Manufacturing Method"; filed: Nov. 11, 2023.

Related U.S. Appl. No. 18/562,009, First Named Inventor: Yoshifumi Takao; Title: "Optical Scanning Device"; filed: Nov. 17, 2023.

Written Opinion dated Jun. 21, 2022, issued in International Application No. PCT/JP2022/018040.

International Search Report (ISR) (and an English language translation thereof) dated Jul. 5, 2022, issued in International Application No. PCT/JP2022/018037.

Written Opinion dated Jul. 5, 2022, issued in International Application No. PCT/JP2022/018037.

Office Action (Non-Final Rejection) dated Aug. 26, 2025, issued in related U.S. Appl. No. 18/277,084.

Office Action (Non-Final Rejection) dated Oct. 30, 2025, issued in related U.S. Appl. No. 18/562,009.

* cited by examiner

OPTICAL SCANNING DEVICE

TECHNICAL FIELD

The present invention relates to an optical scanning device having a laser light source and a MEMS (Micro Electro Mechanical Systems) optical deflector deployed on a single substrate.

BACKGROUND ART

In an optical scanning device, a laser light source and a MEMS optical deflector are preferably mounted on the same substrate to achieve miniaturization. However, both the direction of light emission from the laser light source and the rotating mirror of a MEMS optical deflector inconveniently face upward in the direction perpendicular to the substrate, making it difficult to direct the light from a laser element so as to be incident on the rotating mirror of the MEMS optical deflector.

Consequently, in conventional optical scanning devices, the laser light source and the MEMS optical deflector are mounted on separate substrates placed so as to face each other, or the light emitted from the laser light source is guided to the MEMS optical deflector by an optical fiber (e.g., Patent Literature 1).

Meanwhile, Patent Literature 2 discloses an optical scanning device adapted to display character information on the viewfinder of a camera. In this optical scanning device, a VCSEL, (Vertical Cavity Surface Emitting Laser) and a micromirror are placed on the same substrate, and a mirror that deflects a traveling direction by 90° is provided directly above the VCSEL and the micromirror, and the light emitted upward in the direction perpendicular to the substrate from the VCSEL is reflected by the mirror thereby to be incident on the micromirror on the same substrate. The mirror directly above the micromirror is a half mirror, and the light emitted from the micromirror travels straight without being reflected by the half mirror and is emitted to the outside.

CITATION LIST

Patent Literatures

Patent Literature 1: Japanese Patent Application Laid-Open No. 2009-244869
Patent Literature 2: Japanese Patent Application Laid-Open No. 2010-175677

SUMMARY OF INVENTION

Technical Problem

The diameter of a rotating mirror of a MEMS optical deflector is small. Therefore, in an optical scanning device such as the one disclosed in Patent Literature is required to accurately adjust the direction of a mirror disposed on a substrate at the time of manufacture in order to direct the light emitted from a laser light source to be accurately incident on the rotating mirror of the MEMS optical deflector. However, Patent Literature 2 refers to nothing about such a configuration.

An object of the present invention is to provide a compact optical scanning device having a structure in which a laser light source and a MEMS optical deflector are mounted on the same substrate, and a mirror installed above the substrate is used to make light emitted from the laser light source adjustable such that the emitted light is accurately incident on a mirror of the MEMS optical deflector.

Solution to Problem

An optical scanning device in accordance with the present invention includes:
a substrate;
a surface-emitting laser element mounted on the substrate with an emitting direction thereof facing upward with respect to the substrate;
a MEMS optical deflector mounted on the substrate with a rotating mirror facing upward with respect to the substrate;
a plate-shaped support member fixed to the substrate;
a first mirror extending in a second axial direction which is perpendicular to a first axial direction as an arrangement direction of the surface-emitting laser element and the MEMS optical deflector on the substrate and which is parallel to the substrate, and being supported by a first support part of the plate-shaped support member so as to reflect emitted light from the surface-emitting laser element in the first axial direction; and
a second mirror extending in the second axial direction, and being supported by, a second support part of the plate-shaped support member such that light from the first mirror is reflected toward the rotating mirror of the MEMS optical deflector,
wherein at least one support part out of the first support part and the second support part includes a rotating mechanism which rotatably supports one mirror out of the first mirror and the second mirror supported by the one support part, and a fixing member which fixes a rotational position of the one mirror in the rotating mechanism.

Advantageous Effects of Invention

According to the present invention, one mirror out of the first mirror and the second mirror installed above the substrate permits accurate irradiation of the light emitted from the surface-emitting laser element installed on the substrate to the rotating mirror of the MEMS optical deflector by adjusting the direction of emission with the mirror, thus making it possible to provide a compact optical scanning device.

DESCRIPTION OF EMBODIMENTS

Referring to the accompanying drawings, a plurality of preferred embodiments of the present invention will be described in detail. It is needless to say that the present invention is not limited to the following embodiments. In addition to the following embodiments, the present invention includes a variety of configuration modes within the scope of the technical idea of the present invention.

(Configuration)

Figure 1A:
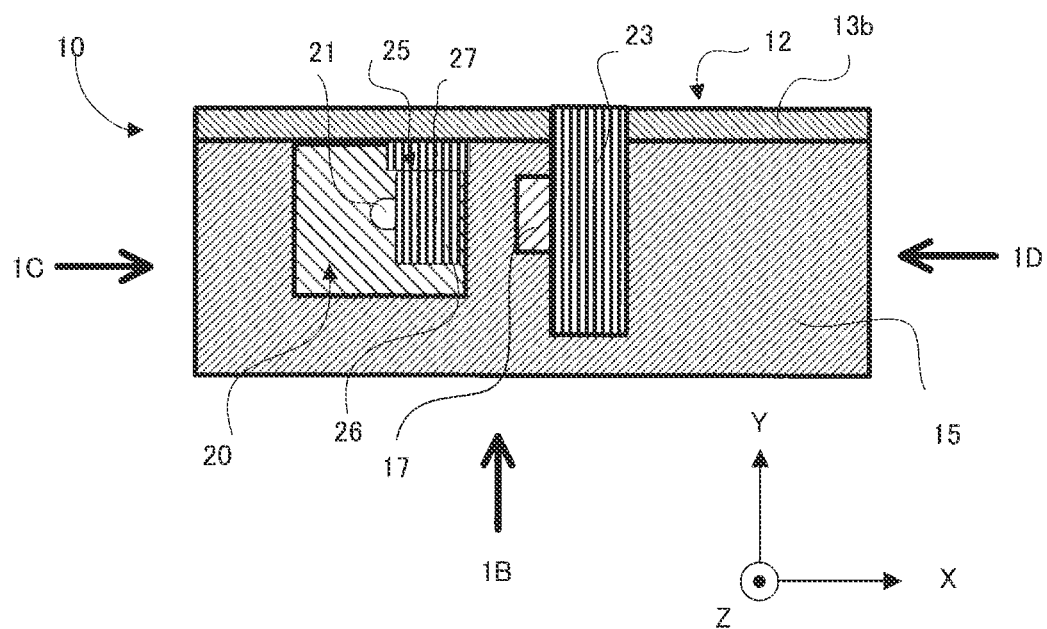
FIG. 1A is a plan view of an optical scanning device.
Figure 1B:
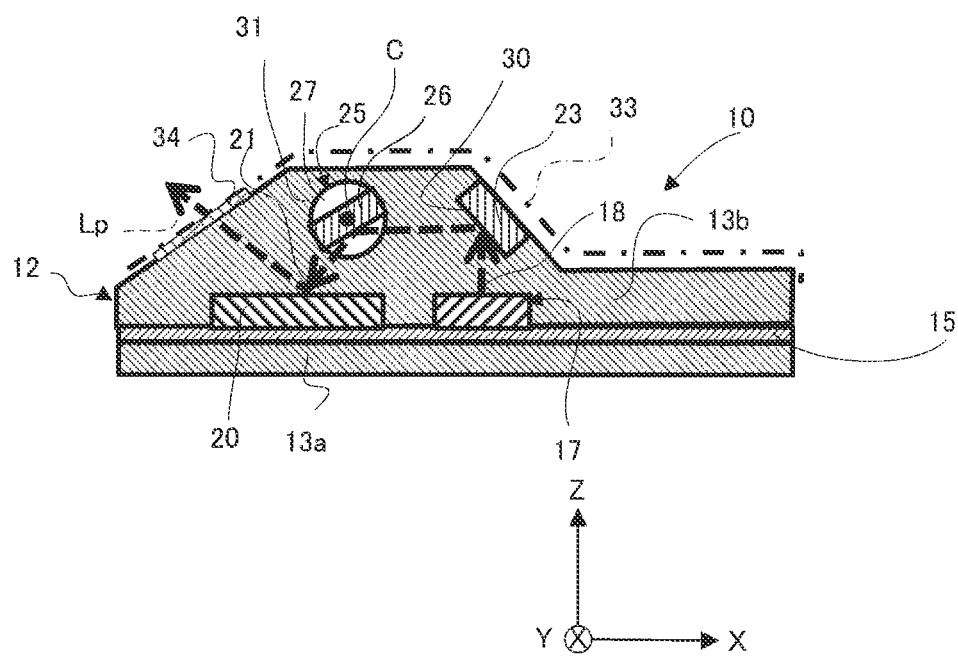
FIG. 1B is a view on arrow 1B of FIG. 1A.
Figure 1C:
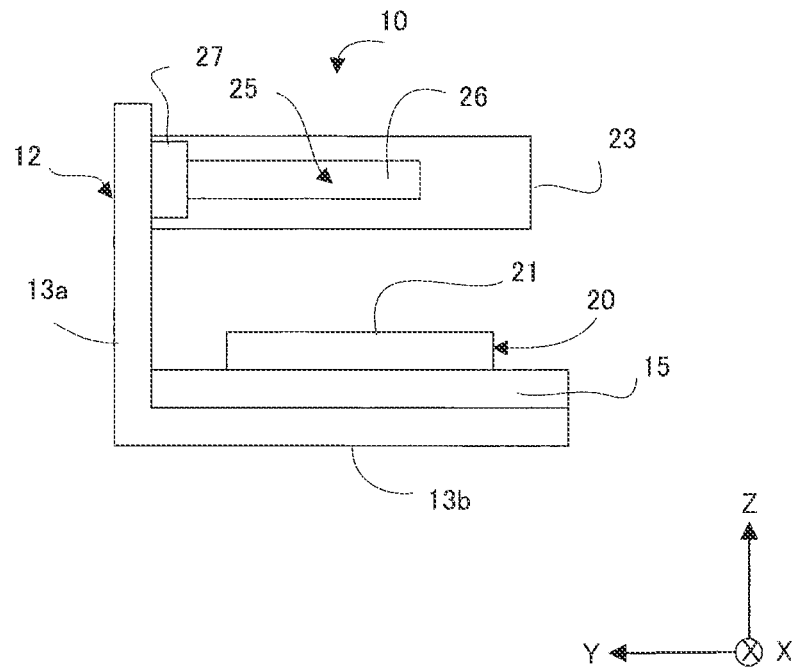
FIG. 1C is a view on arrow 1C of FIG. 1A.
Figure 1D:
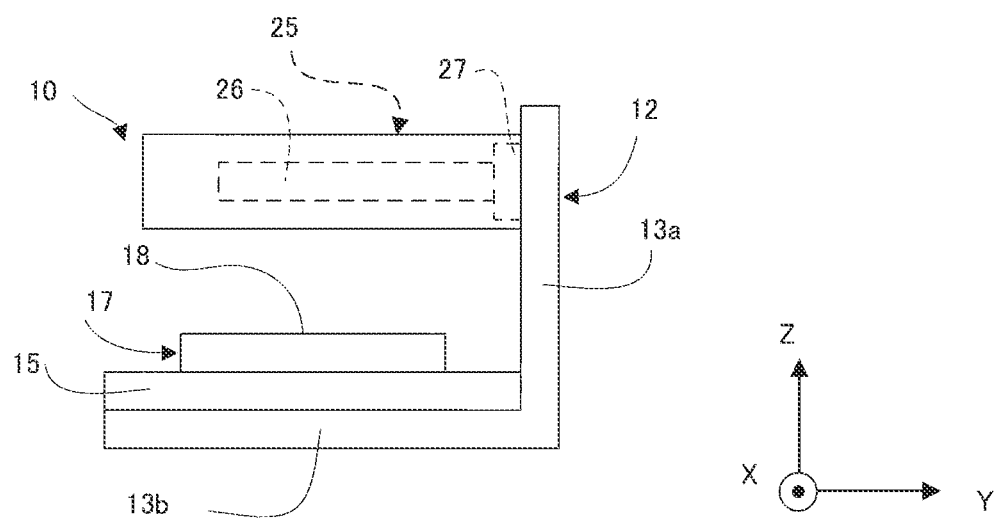
FIG. 1D is a view on arrow 1D of FIG. 1A.

FIG. 1A is a plan view of an optical scanning device 10, FIG. 1B is a view on arrow 1B of FIG. 1A, FIG. 1C is a view on arrow 1C of FIG. 1A, and FIG. 1D is a view on arrow 1D of FIG. 1A. FIG. 1A to FIG. 1l) illustrate the optical scanning device 10 with a cover 33 (indicated by one-dot chain line of FIG. 1B) removed.

The optical scanning device 10 includes a support frame body 12. The support frame body 12 has an L-shaped cross-sectional contour, and has a bottom plate part 13a and a standing plate part 13b that are vertically connected. The substrate 15 has a rectangular shape and is placed on and fixed to the upper surface of the bottom plate part 13a.

For the convenience of explanation, a three-axis Cartesian coordinate system will be defined. An X-axis and a Y-axis are defined as axes in directions parallel to the longitudinal direction (direction parallel to the long sides) and the lateral direction (direction parallel to the short sides), respectively, of the substrate 15. A Z-axis is defined as an axis parallel to the standing direction of the standing plate part 13b from the substrate 15.

In the optical scanning device 10, the scanning light is emitted from the left side in FIG. 1B, i.e., from the end on the negative side of the optical scanning device 10 in the X-axis direction, so that the negative side and the positive side in the X-axis will be referred to as the front and the back, respectively, of the optical scanning device 10, as appropriate. Further, in the substrate 15, the positive side and the negative side in the Z-axis direction are the upper surface and the lower surface, respectively, so that the positive side and the negative side in the Z-axis are defined as the upper side and the lower side, respectively, of the optical scanning device 10, as appropriate.

A VCSEL 17 and a MEMS optical deflector 20 are mounted on the upper surface of the substrate 15 with the X-axis direction as the arrangement direction. The VCSEL 17 has an emitting part 18 on the upper surface thereof, and emits laser light upward in parallel to the Z-axis direction from the emitting part 18. The MEMS optical deflector 20 directs the mirror surface of a rotating mirror 21 upward in the Z-axis direction.

The MEMS optical deflector 20 in this embodiment is a two-dimensional scanning type MEMS optical deflector, but may alternatively be a one-dimensional scanning type MEMS optical deflector. The configuration itself of the MEMS optical deflector is known in various forms. For example, the MEMS optical deflector described in Japanese Patent Application Laid-Open No. 2017-207630 (two-dimensional scanning type MEMS optical deflector) or Japanese Patent Application Laid-Open No. 2014-056020 (one-dimensional scanning type MEMS optical deflector) is selected.

Figure 2:
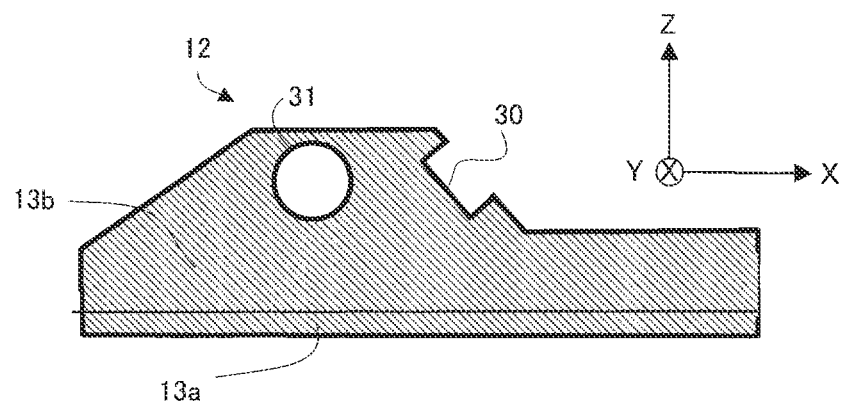
FIG. 2 is a side view of a support frame body.

FIG. 2 is a side view of the support frame body 12. Referring to FIG. 1A to FIG. 1D and FIG. 2, the support frame body 12, a plate-shaped mirror 23, and a rotary mirror 25 will be described.

The standing plate part 13b of the support frame body 12 has an inclined groove and a through hole 31. The inclined groove 30 has a rectangular shape in the side view of FIG. 2, and opens obliquely rearward upward along the side contour of the standing plate part 13b. The bottom surface of the inclined groove 30 is formed of an inclined surface inclined at 45° with respect to the substrate 15. The through hole 31 is formed as a cylindrical hole penetrating through the standing plate part 13b in the Y-axis direction.

In the X-axis direction, the center of the width (the length when viewed from side in FIG. 1B) of the inclined surface (the bottom surface) of the inclined groove 30 is located at the same position as that of the emitting part 18 of the VCSEL 17. In the X-axis direction, a centerline C of the cylindrical hole of the through hole 31 is positioned between the VCSEL 17 and the rotating mirror 21 of the MEMS optical deflector 20 in the X-axis direction. In the Z-axis direction, the center of the length of the inclined surface of the inclined groove 30 and the centerline of the cylindrical hole of the through hole 31 are located at the same position, i.e., at the same height from the substrate 15.

The plate-shaped mirror 23 is composed of a rectangular plate-shaped member, and one end portion thereof is bonded to the inclined surface of the inclined groove 30 in a cantilevered state by an adhesive material such as a resin, with the lower plate surface thereof as a mirror surface. The plate thickness of the plate-shaped mirror 23 is set substantially equal to the depth of the inclined groove 30.

The plate width of the plate-shaped mirror 23 (the length when viewed from side in FIG. 1B) is set to be slightly shorter than the width of the inclined groove 30 (the length when viewed from side in FIG. 1B). Consequently, in the state before one end portion of the plate-shaped mirror 23 is bonded to the inclined groove 30, i.e., before the one end portion is fixed, the plate-shaped mirror 23 can be slightly displaced in the inclined surface direction of the bottom surface in the inclined groove 30, and the angle of rotation about the axis parallel to the Y-axis can be changed. Such a change makes it possible to adjust the orientation of the mirror surface of the plate-shaped mirror 23 at the time of manufacturing the optical scanning device 10.

The rotary mirror 25 has a mirror part 26 shaped like a flat plate and a cylindrical fitting end part 27 connected to one end portion of the mirror part 26 and fitted into the through hole 31. The diameter of the fitting end part 27 is slightly smaller than the diameter of the through hole 31. Therefore, in the state before the fitting end part 27 is bonded into the through hole 31, i.e., before being fixed, the rotary mirror 25 can be rotated about the centerline of the through hole 31 while the fitting end part 27 is being fitted into the through hole 31, and can be tilted within a predetermined tilt angle range from a state in which the centerline of the rotary mirror 25 coincides with the centerline of the through hole 31. This permits rotational displacement in a wider angle range than that of the plate-shaped mirror 23. The rotatable and tiltable configuration described above makes it possible to adjust the orientation of the mirror surface of the mirror part 26 when the optical scanning device 10 is manufactured. After making the adjustment, the fitting end part 27 is bonded to be fixed using an adhesive material such as a resin.

The rotating mirror 21 of the MEMS optical deflector 20 is positioned, with respect to the rotary mirror 25, on the front side, i.e., on the negative side with respect to the rotary mirror 25 in the X-axis direction rather than being positioned directly below the rotary mirror 25, This configuration contributes to emitting light Lp from the optical scanning device 10 in a direction diagonally forward rather than in the vertical direction with respect to the substrate 15, as will be described later. This configuration also ensures that, when the optical scanning device 10 is attached to a temple of a glasses body as a video scanning device for smart glasses, the light emitted from the optical scanning device reaches the inner surface of a lens of the glasses body without being interfered with by the face of a user through a small gap between a video device and the face of the user (FIG. 6).

The plate-shaped mirror 23 and the rotary mirror 25 correspond to a first mirror and a second mirror, respectively, of the optical scanning device in accordance with the present invention. Regarding the plate-shaped mirror 23 and the rotary mirror 25, the support positions in the standing plate part 13*b* can be reversed to make the plate-shaped mirror 23 and the rotary mirror 25 correspond to the second mirror and the first mirror, respectively, of the optical scanning device in accordance with the present invention. In such a case, according to changes of the support positions, the positions of the inclined groove 30 and the through hole 31 in the X-axis direction are reversed. The plate-shaped mirror 23 as the second mirror applies the reflected light thereof to the rotating mirror 21 of the MEMS optical deflector 20, so that the tilt angle of the plate-shaped mirror 23 is changed from 45° for the first mirror to approximately 24°.

Figure 6:
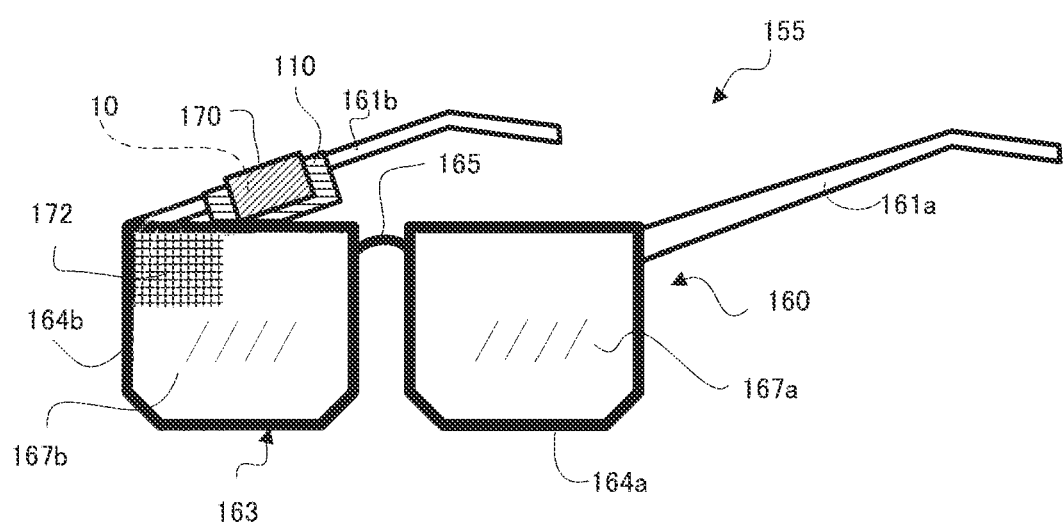
FIG. 6 is a view illustrating a glasses video display device as an application example of the optical scanning device.

FIG. 6 is a diagram illustrating a glasses video display device 155 as an application example of the optical scanning device 10. The glasses video display device 155 will be briefly described. The glasses video display device 155 includes a glasses main body 160 and a video generator 110 detachably attached to the glasses main body 160 by a clip 170. The glasses main body 160 includes left and right temples 161*a* and 161*b* and a front frame 163 connected to the front ends of the left and right temples 161*a* and 161*b* at both left and right ends. The front frame 163 further includes left and right lens frames 164*a* and 164*b*, and a bridge 165 connecting the left and tight lens frames 164*a* and 164*b*.

The optical scanning device 10 is incorporated in the video generator 110 along the extension direction of the temple 161*b* of the glasses main body 160 along with other elements (e.g., a MEMS sensor buffer amplifier and an LDD (laser driver)) arranged in a single row. In this single row arrangement, the optical scanning device 10 is placed at the forefront, i.e., closest to a lens 167. Thus, the light Lp (FIG. 3B) emitted from the optical scanning device 10 irradiates the inner surface of the lens 167 to generate video in a scanning area 172.

The cover 33 (FIG. 1B) extends along the contour of the standing plate part 13*b* above the substrate 15 to cover the standing plate part 13*b* from above, and has the peripheral edge of the lower end thereof secured to the peripheral edge of the bottom plate part 13*a*. The cover 33 has a transparent portion 34 in a portion thereof through which at least the light Lp, which will be described later, turns into scanning light and is emitted from the optical scanning device 10, (Correction Prism)

Figure 5:
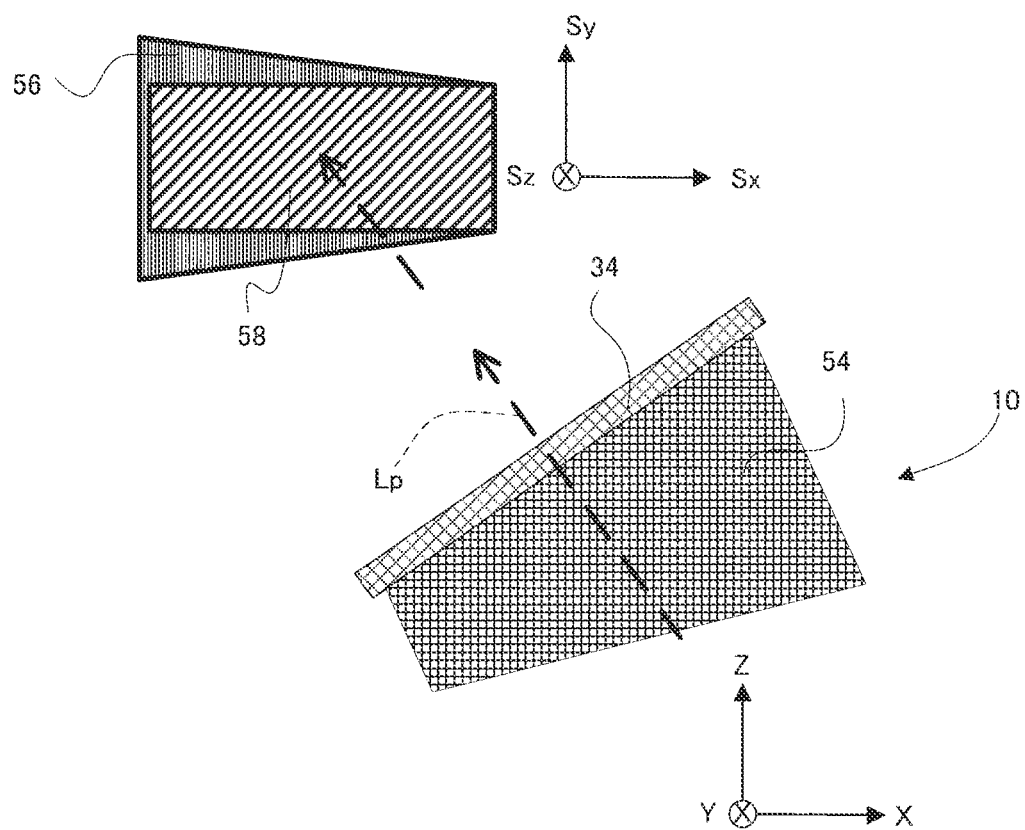
FIG. 5 is a diagram illustrating the configuration in which a correction prism has been attached to the inner surface of a transparent part.

FIG. 5 illustrates a configuration in which a correction prism 54 has been attached to the inner surface of the transparent portion 34. Reference numeral 56 indicates the scanning area generated at an irradiation destination by the light Lp emitted as the scanning light through the transparent portion 34 of the optical scanning device 10 in the case where the correction prism 54 is absent. Reference numeral 58 indicates a scanning area generated at the irradiation destination by the light Lp emitted as the scanning light through the transparent portion 34 of the optical scanning device 10 in the case where the correction prism 54 is present.

The rotating mirror 21 of the MEMS optical deflector 20 rotates resonantly and non-resonantly about the X-axis and about the Y-axis, respectively. As a result, the light Lp emitted from the rotating mirror 21 becomes scanning light for two-dimensional scanning. The resonant frequencies and the non-resonant frequencies are, for example, 30 kHz to 40 kHz and 60 Hz to 120 Hz, respectively. Further, the reciprocating rotation angle of the rotating mirror 21 about the X-axis is larger than the reciprocating rotation angle of the rotating mirror 21 about the Y axis.

The reciprocating rotation of the rotating mirror 21 about the X-axis in the optical scanning device 10 causes the light Lp to perform reciprocating scanning in an Sx-axis direction in a pre-correction scanning area 56 or a post-correction scanning area 58. The reciprocating rotation of the rotating mirror 21 about the Y-axis in the optical scanning device 10 causes the light Lp to perform reciprocating scanning in an Sy-axis direction in the pre-correction scanning area 56 or the post-correction scanning area 58.

When the correction prism 54 is not provided, the light Lp generates the pre-correction scanning area 56 at a scanning destination. The pre-correction scanning area 56 has a distorted shape with respect to a rectangle. On the other hand, when the correction prism 54 is provided, the light Lp generates a rectangular post-correction scanning area 58 in which the distortion has been corrected. The post-correction scanning area 58 corresponds to the inscribed rectangle of the pre-correction scanning area 56.

(Operation)

Referring to FIG. 1B, the dashed line along which the light Lp is drawn out indicates the optical path of the light Lp. The light Lp emitted from the emitting part 18 of the VCSEL 17 is laser light sufficiently weakened so as not to harm human eyes.

The light Lp is emitted from the emitting part 18 of the VCSEL 17 perpendicularly to the substrate 15 and upward (the positive direction in the Z-axis direction), When the light Lp is incident on the plate-shaped mirror 23, the light Lp is reflected by the plate-shaped mirror 23, and changes the direction thereof to be parallel to the X-axis as the arrangement direction of the VCSEL 17 and the emitting part 18 on the upper surface of the substrate 15, and to be on the negative side of the X-axis. Then, after traveling forward parallel to the X-axis (to the negative side of the X-axis), the light Lp is incident on the obliquely downward mirror surface of the mirror part 26 of the rotary mirror 25.

The tilt angle of the mirror part 26 with respect to the substrate 15 is smaller than 45°. Consequently, the light Lp reflected on the mirror part 26 travels in parallel to the Z-axis direction, i.e., descends obliquely forward without descending to the substrate 15 in the vertical direction with respect to the substrate 15, and strikes the center of the rotating mirror 21 of the MEMS optical deflector 20.

The rotating mirror 21 is rotated two-dimensionally. Consequently, the light Lp incident on the rotating mirror 21 turns into scanning light for two-dimensional scanning, and travels obliquely forward and upward from the rotating mirror 21.

(Method for Installing the Mirrors at the Time of Manufacture)

Referring to FIG. 3A to FIG. 3D and FIG. 4A to FIG. 4B, a description will be given of how to install the plate-shaped mirror 23 and the rotary mirror 25 at the time of manufacturing the optical scanning device 10.

Figure 3A:
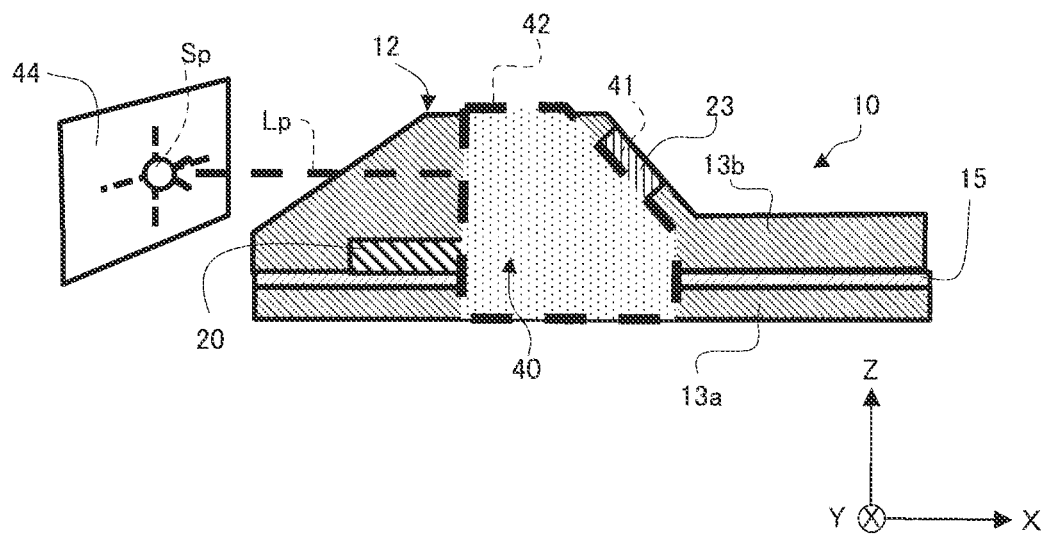
FIG. 3A is a side view illustrating a plate-shaped mirror, the position of which is being adjusted using an angle adjustment jig.
Figure 3B:
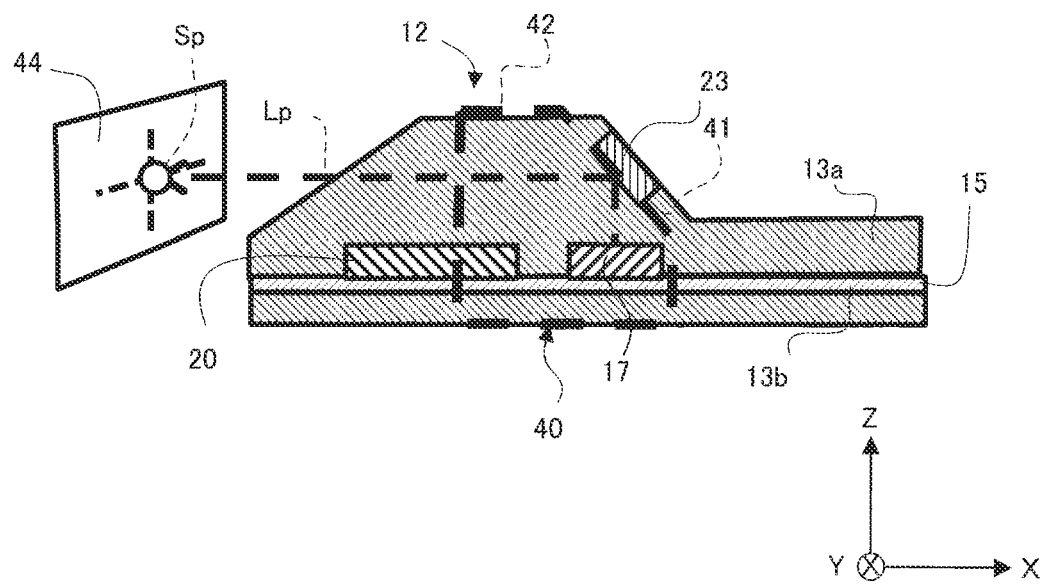
FIG. 3B is a see-through view of the jig in FIG. 3A.
Figure 3C:
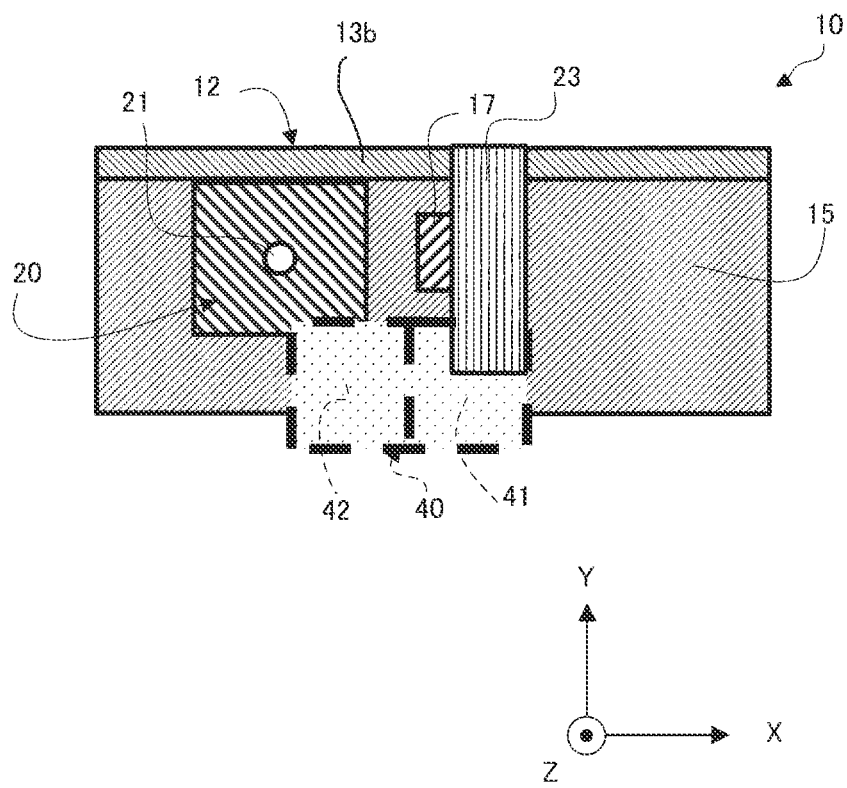
FIG. 3C is a view illustrating the optical scanning device observed from above in FIG. 3A.
Figure 3D:
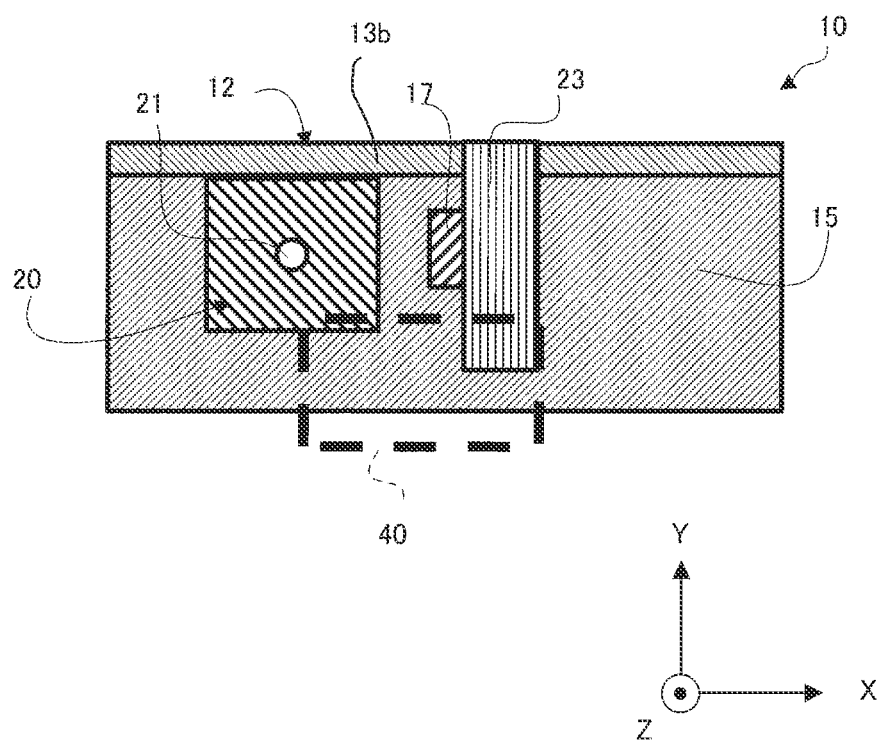
FIG. 3D is a see-through view of the jig in FIG. 3C.

FIG. 3A to FIG. 3D are explanatory diagrams illustrating the process of attaching one end portion of the plate-shaped mirror 23 to the bottom surface of the inclined groove 30, which is an inclined surface part. FIG. 3A is a side view illustrating the process of adjusting the position of the plate-shaped mirror 23 by using a jig 40 for adjusting the angle of the plate-shaped mirror 23, FIG. 3B is a see-through view of the jig 40 in FIG. 3A, FIG. 3C is a view of the optical scanning device 10 viewed from above in FIG. 3A, and FIG. 3D is a see-through view of the jig 40 in FIG. 3C.

The plate-shaped mirror 23 is installed to the inclined groove 30 by an operator watching the position of a light spot Sp on a screen 44 such that the angles in the directions of the three axes (the X-axis, the Y-axis and the Z-axis) of the plate-shaped mirror 23 are appropriate, i.e., the plate-shaped mirror 23 is properly oriented.

The optical scanning device 10 is mounted on a predetermined installation work device in a state before the plate-shaped mirror 23 is installed. In the mounted state, the support frame body 12 is fixed together with the substrate 15 to the installation work device.

Then, one end portion of the plate-shaped mirror 23 is inserted into the inclined groove 30, and the jig 40 is inserted into the lower surface side of the other end portion of the plate-shaped mirror 23, i.e., into the mirror surface side, from the other end side of the plate-shaped mirror 23.

The jig 40 has an inclined surface 41 and an upper surface 42. The inclined surface 41 of the jig 40 is applied to the other end portion of the mirror surface of the plate-shaped mirror 23, the other end portion is rotated about an axis parallel to the Y-axis, and the other end portion is displaced in the X-axis direction (the longitudinal direction of the optical scanning device 10) and the Z-axis direction (the height direction of the optical scanning device 10).

While the position of the plate-shaped mirror 23 is being adjusted using the jig 40, the VCSEL, 17 is in an ON state. Therefore, the light spot Sp is generated on the screen 44, and the position of the light spot Sp on the screen 44 two-dimensionally changes as the jig 40 moves.

The operator operates the jig 40 to move one end portion of the plate-shaped mirror 23 within the inclined groove 30 while watching the position of the light spot Sp on the screen 44. Then, when the light spot Sp reaches a set position on the screen 44, the operator operates the jig 40 to hold the plate-shaped mirror 23 in the orientation (posture and position) at that time.

Next, while holding the plate-shaped mirror 23 in the orientation at that time, the operator applies droplets of an adhesive to a plurality of locations across one end portion of the plate-shaped mirror 23 and the inclined groove 30. Thus, the plate-shaped mirror 23 is fixed to the inclined surface of the bottom wall of the inclined groove 30 in the orientation obtained when the light spot Sp is at the set position on the screen 44. At this time, the mirror surface of the plate-shaped mirror 23 reflects the light 14 emitted from the emitting part 18 of the VCSEL 17 toward the rotary mirror 25 in parallel to the X-axis.

In other words, the plate-shaped mirror 23 is fixed in any orientation by holding the plate-shaped mirror 23 stationary in an arbitrary orientation with one end portion thereof placed against the inclined surface of the bottom wall of the inclined groove 30, applying the droplets of the adhesive to the plurality of locations across the one end portion of the plate-shaped mirror 23 and the inclined groove 30, and letting the adhesive dry.

Figure 4A:
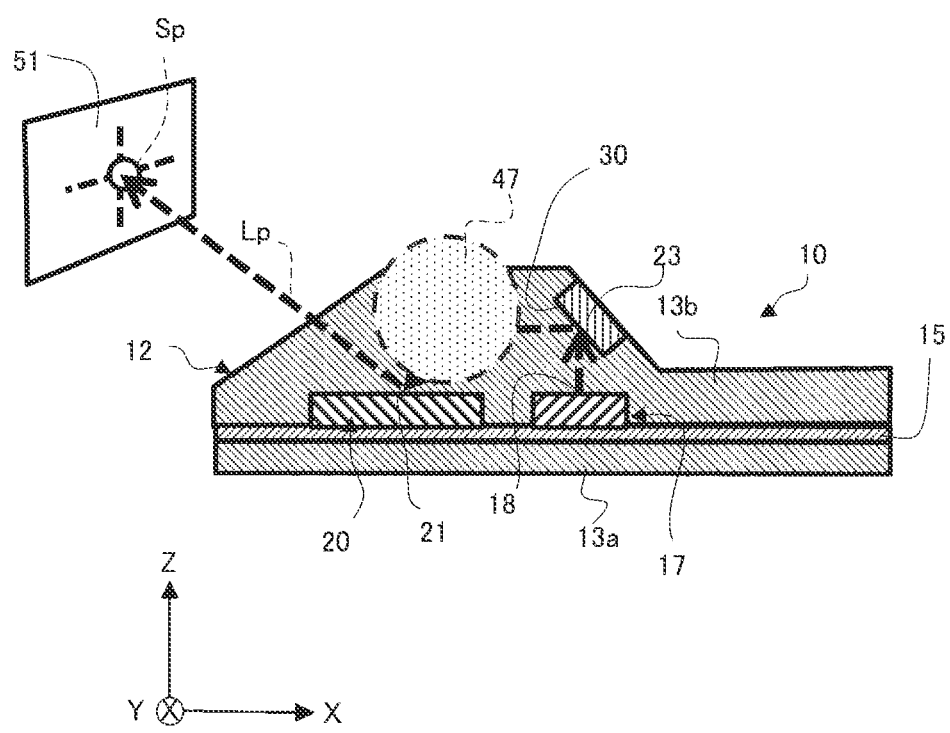
FIG. 4A is a side view illustrating a rotary mirror, the position of which is being adjusted using a jig.
Figure 4B:
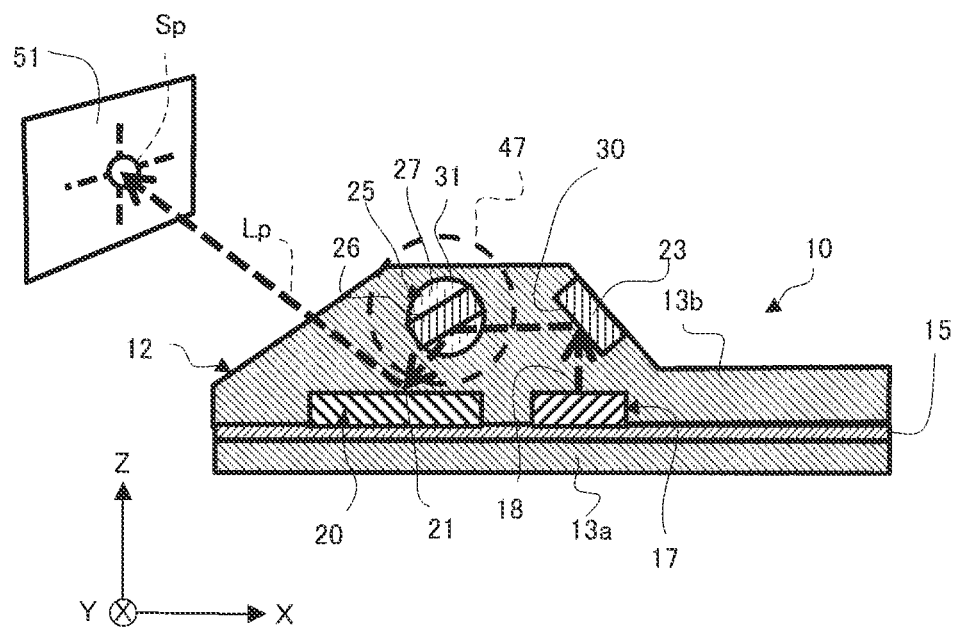
FIG. 4B is a see-through view of the jig in FIG. 4A.

FIG. 4A and FIG. 4B are explanatory diagrams illustrating the process of installing one end portion of the rotary mirror 25 into the through hole 31. FIG. 4A is a side view illustrating the rotary mirror 25 when the position thereof is being adjusted using a jig 47 for adjusting the orientation of the rotary mirror 25, and FIG. 4B is a see-through view of the jig 47 in FIG. 4A.

The jig 47 grips the other end portion of the mirror part 26, travels to the positive side in the Y-axis direction, and fits the fitting end part 27 into the through hole 31. Then, the VCSEL 17 is turned on again, No driving voltage is supplied to the actuator of the MEMS optical deflector 20, the rotating mirror 21 is in a stationary state, and the normal line of the reflecting surface of the rotating mirror 21 is directed in parallel to the Z-axis. The screen 51 is located obliquely in front of the optical scanning device and above the MEMS optical deflector 20 in the Z-axis direction. The light Lp emitted from the rotary mirror 25 strikes the screen 51, generating the light spot Sp.

The jig 47 rotates the rotary mirror 25 about the centerline of the through hole 31, and adjusts the rotation angle of the rotary mirror 25 about the centerline such that the light spot Sp reaches the set position on the screen 51. When the light spot Sp reaches the set position, the rotation of the rotary mirror 25 by the jig 47 is stopped.

The operator stops moving the rotary mirror 25 when the light spot Sp reaches the set position on the screen 51, and applies droplets of the adhesive to a plurality of locations across the through hole 31 and the fitting end part 27, as with the case of bonding one end portion of the plate-shaped mirror 23 in the inclined surface of the bottom surface of the inclined groove 30. Thus, the orientation of the rotary mirror 25 is adjusted to an orientation ensuring that the light Lp to be emitted from the rotating mirror 21 of the MEMS optical deflector 20 is emitted in a proper direction.

Another Embodiment

Figure 7A:
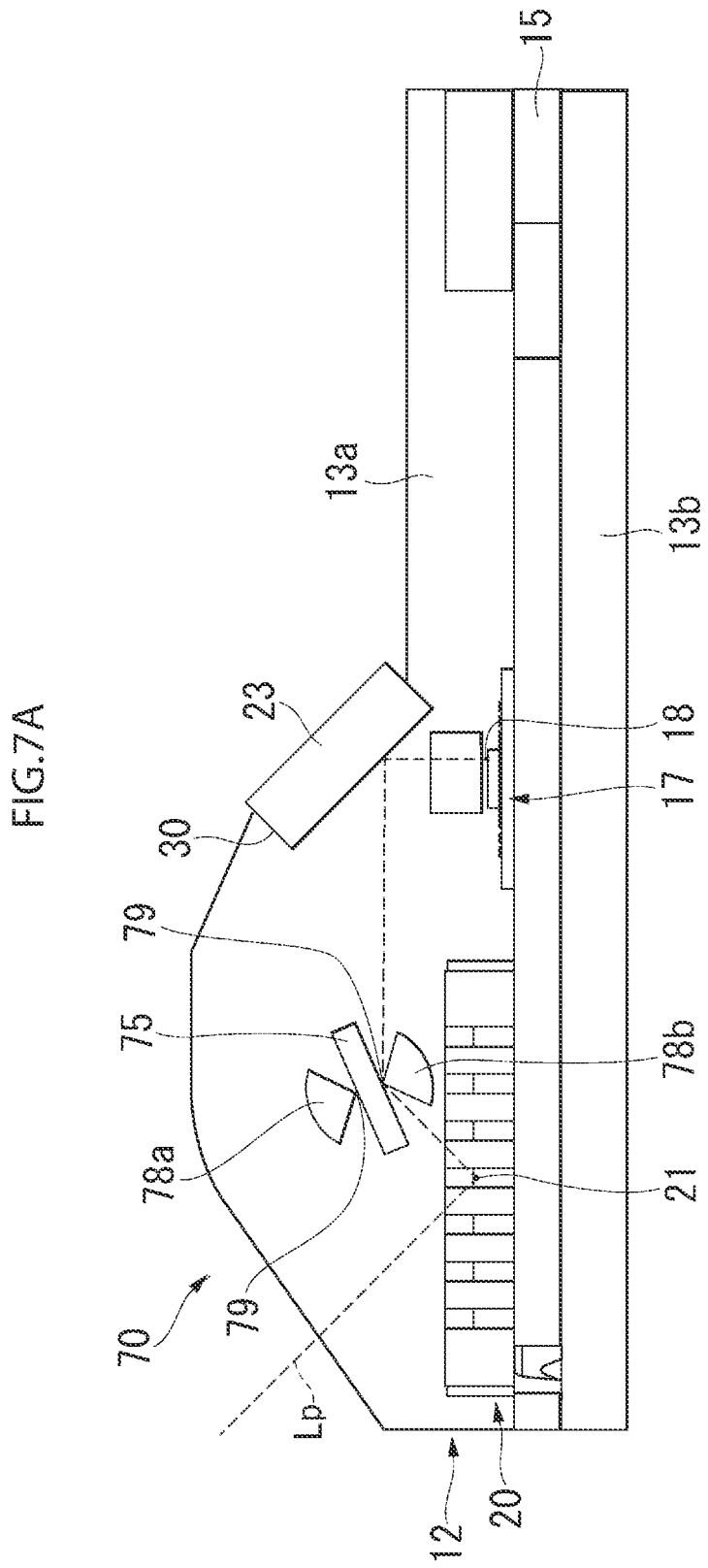
FIG. 7A is a side view of another optical scanning device.
Figure 7B:
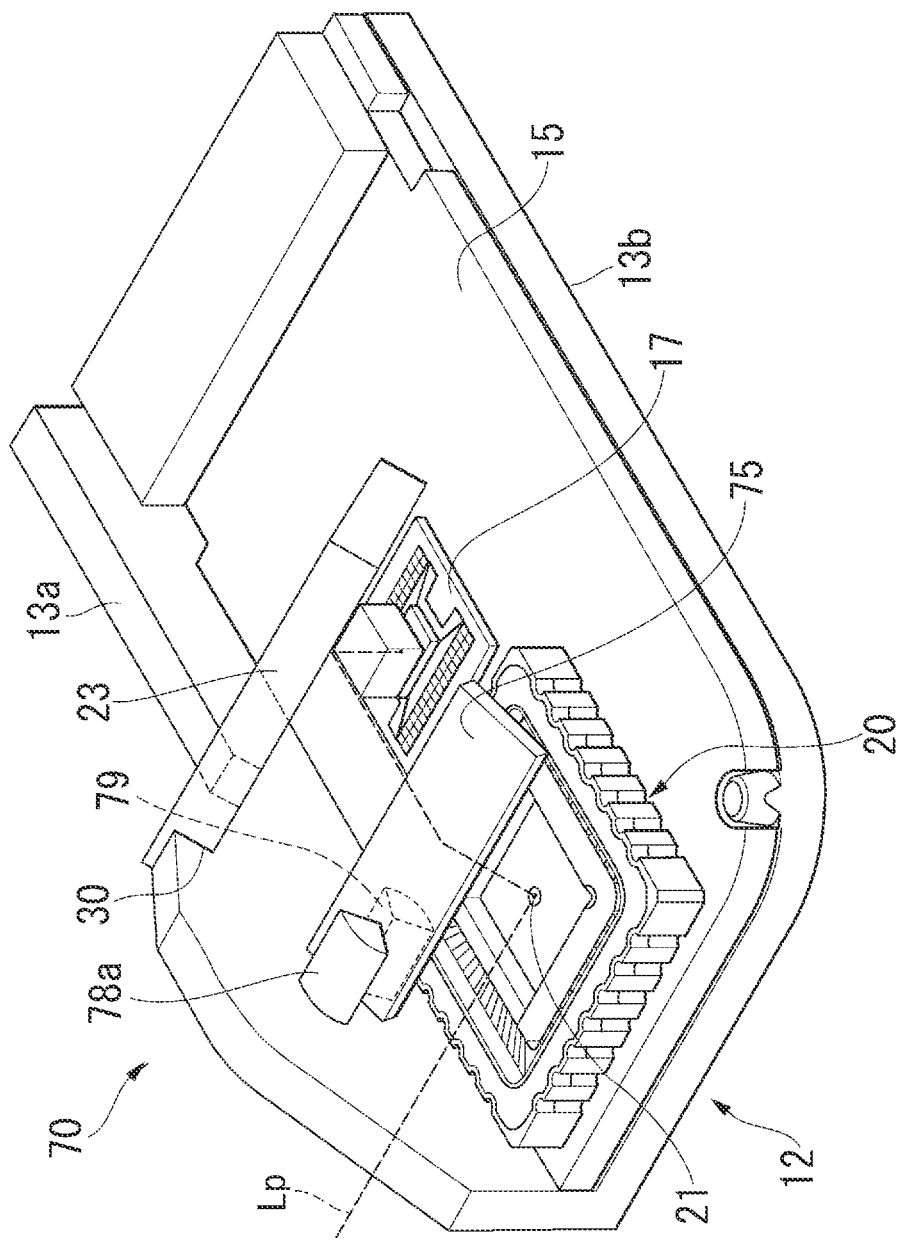
FIG. 7B is a perspective view of the optical scanning device of FIG. 7A.

FIG. 7A and FIG. 7B are a side view and a perspective view; respectively, of an optical scanning device 70, which is another embodiment of the present invention. In the optical scanning device 70, the same elements as those of the optical scanning device 10, which is the above-described embodiment will be assigned the same reference numerals as those of the elements of the optical scanning device 10, and the descriptions thereof will be omitted.

The optical scanning device 10 and the optical scanning device 70 differ in the rotation mechanism of a second mirror in the optical scanning device. More specifically, in the rotary mirror 25 as the second mirror in the optical scanning device 10, the end portion thereof adjacent to the standing plate part 13b fits in the through hole 31 of the support frame body 12, and the angle of rotation about the centerline C is adjusted before the end portion thereof is fixed using the adhesive. On the other hand, a plate-shaped mirror 75 as the second mirror of the optical scanning device 70 is fixed to points 79 by adhesion while being pressed between the points 79 of a pair of edge members 78a and 78b from both surfaces.

The fixing structure of the optical scanning device 70 is as described in detail below. The edge members 78a and 78b are composed of bar pieces having fan-shaped cross sections, and have their bases fixed to the standing plate part 13b, and protrude in parallel to a substrate 15 from the standing plate part 13b. The edge-like points 79 of the edge members 78a, and 78b form edge lines as protruding ends of the fan-shaped cross sections, and are opposed to each other with a gap equivalent to the plate thickness of the plate-shaped mirror 75.

The plate-shaped mirror 75 is inserted into the gap between the two points 79 with the mirror surface side as the lower surface, and before being fixed to the two points 79 by adhesion, the plate-shaped mirror 23 is pressed between the two points 79 from both sides with a predetermined pressing pressure while being maintained rotatable about the centerline of the gap between the two points 79. After that, the plate-shaped mirror 75 has the rotation angle thereof adjusted by the method described with reference to FIG. 4A and FIG. 4B. More specifically, the plate-shaped mirror 75 is adjusted to a rotation angle at which the light spot Sp is formed at a target position on the screen 51 when the light Lp from the plate-shaped mirror 23 is reflected on the mirror surface of the plate-shaped mirror 75. After the adjustment, the plate-shaped mirror 75 is fixed to the two points 79 by adhesion so as to fix the rotation angle.

Advantageous Effects of the Embodiments

The through hole 31 of the standing plate part 13b as the second support part, into which the fitting end part 27 as one end portion of the rotary mirror 25 is fitted, has a cylindrical hole as a rotating body having the centerline of the through hole 31 as the centerline thereof. As a result, at the time of manufacturing the optical scanning device 10, the position of rotation of the rotary mirror 25 about the center of the through hole 31, which serves as one of the positioning means for the rotary mirror 25, can be accurately set.

The through hole 31 has a cylindrical shape. Further, the fitting end part 27 as one end portion of the rotary mirror 25 is fixed to the through hole 31 by adhesion. The adhesion allows the adhesion positions of an adhesive at adhesion portions to be adjusted and the distribution of an adhesive amount to be changed. Therefore, in the manufacture, not only the position of rotation of the mirror part 26 of the rotary mirror 25 about the axis of the through hole 31 but various other positions can be adjusted, thus making it possible for the rotary mirror 25 to be properly oriented before being fixed to the standing plate part 13b.

Forming the through hole 31 in a truncated cone that gradually narrows toward the end of insertion of the fitting end part 27 into the through hole 31 makes it possible to simplify the positioning of the through hole 31 in the direction of the centerline C of the cylindrical hole at the time of manufacture.

According to the optical scanning device 10, one end portion of the plate-shaped mirror 23, which reflects the light Lp emitted from the VCSEL, 17 perpendicularly with respect to the substrate 15 in the direction parallel to the direction in which the VCSEL 17 and the MEMS optical deflector 20 are arranged in the substrate 15, is bonded to the inclined surface, which is the bottom portion of the inclined groove 30. The adhesion allows not only the tilt angle of the inclined surface to be easily changed but also the orientation of the plate-shaped mirror 23 to be easily changed in various orientations although within a small range by adjusting an adhesion position and the adhesion amount (uplift amount) at the adhesion position. This makes it possible to accurately adjust the orientation of the plate-shaped mirror 23 to a desired orientation.

The rotating mirror 21 of the MEMS optical deflector 20 is placed apart from the rotary mirror 25 in the X-axis direction rather than directly below the rotary mirror 25, thus enabling the light Lp as the scanning light to be obliquely emitted rather than perpendicularly with respect to the substrate 15. Advantageously, such an emitting direction advantageously makes it possible to form a scanning area of the scanning light on the inner surface of a lens of glasses through a small gap between the face of a user and a temple of the glasses when the optical scanning device 10 is attached to the temple of the glasses to use the glasses as smart glasses.

Modified Example

The fitting end part 27 and the through hole 31 in the optical scanning device 10 and the pair of edge members 78 in the optical scanning device 70 correspond to the rotating mechanism of the present invention. In the embodiments, the fixing members serve as the adhesive members; however, fastening members other than adhesive members, such as screws, can be selected as appropriate.

The optical scanning device 10 includes the VCSEL 17. The VCSEL 17 is an example of a surface-emitting laser element. The present invention can employ a laser light source other than a vertical cavity surface-emitting laser (VCSEL) as long as the laser light source is a surface-emitting laser element.

The standing plate part 13b of the support frame body 12 is an example of a plate-shaped support member fixed to the substrate 15. The standing plate part 13b is fixed to the substrate 15 through the intermediary of the bottom plate part 13a; however, the plate-shaped support member of the present invention can be fixed directly to a substrate.

In the optical scanning devices 10 and 70, the plate-shaped mirror 23 and the rotary mirror 25 or the plate-shaped mirror 75 as the first mirror and the second mirror have one end portion thereof supported by the standing plate part 13h in the Y-axis direction as the second axial direction and the other end thereof remaining a free end, thus being fixed in a cantilever support state. The first mirror and the second mirror of the present invention may be supported at both ends when the optical scanning devices 10 and 70 are completed.

In the optical scanning device 10, only the through hole 31 as the second support part has the shape of a rotating body. In the present invention, the inclined groove 30 having the bottom surface as the first support part may also be a through hole having the shape of a rotating body. Inversely, the first support part can be a through hole having the shape of a rotating body, and the second support part can be an inclined surface part.

In the drawings, the X-axis, the Y-axis, and the Z-axis are defined as corresponding to the first axis, the second axis, and the third axis, respectively, of the present invention. This definition, however, is only for convenience in describing the optical scanning device 10 of the embodiment.

The optical scanning device 10 can be applied as a video generation device in smart glasses, and can also be applied as a video generation device in an ultra-small projector or interactive projector.

The optical scanning device 10 is capable of controlling the intensity of the light Lp emitted from the VCSEL 17 to generate video in a scanning area. However, the optical scanning device 10 of the embodiment is equipped with only one VCSEL 17, and is therefore capable of generating only monochrome video. To generate color video, the optical scanning device 10 has to be equipped with a total of three VCSELs 17 outputting light corresponding to three primary colors. The VCSELs 17 of the three different colors are mounted on the substrate 15 in such a manner as to be arranged in a row in the X-axis direction together with the MEMS optical deflector 20, and the three plate-shaped mirrors 23 are arranged in a row in the X direction at the same height immediately above the three VCSELs 17. Then, of these three plate-shaped mirrors 23, the first and the second plate-shaped mirrors 23 from the side closer to the rotary mirror 25 serve as half mirrors, so that the light Lp coming in from the second and the third plate-shaped mirrors 23 is allowed to directly travel straight to the rotary mirror 25.

In the above-described embodiment, the rotating mirror 21 and the plate-shaped mirror 23 are each cantilever-supported by the single standing plate part 13b; however, the present invention is not limited thereto. The rotating mirror 21 and the plate-shaped mirror 23 may be supported at both ends by two opposing standing plate parts 13b, or the rotating mirror 21 and the plate-shaped mirror 23 may be each supported by each of the opposing standing plate parts 13b. Further, the standing plate part 13b may be a wall surface of the housing of the optical scanning device 10 instead of an independent plate part.

DESCRIPTION OF REFERENCE NUMERALS 10, 70 . . . optical scanning device; 13b . . . standing plate part (plate-shaped support member); 15 . . . substrate; 17 . . . VCSEL, (surface-emitting laser element); 20 . . . MEMS optical deflector; 21 . . . rotating mirror; 23, 75 . . . plate-shaped mirror; 25 . . . rotary mirror; 26 . . . mirror part; 27 . . . fitting end part (one end portion); 30 . . . inclined groove (inclined surface); and 31 . . . through hole.

The invention claimed is:

1. An optical scanning device comprising:
a substrate;
a surface-emitting laser element mounted on the substrate with an emitting direction thereof facing upward with respect to the substrate;
a MEMS optical deflector mounted on the substrate with a rotating mirror facing upward with respect to the substrate;
a plate-shaped support member fixed to the substrate;
a first mirror extending in a second axial direction which is perpendicular to a first axial direction as an arrangement direction of the surface-emitting laser element and the MEMS optical deflector on the substrate and which is parallel to the substrate, and being supported by a first support part of the plate-shaped support member so as to reflect emitted light from the surface-emitting laser element in the first axial direction; and
a second mirror extending in the second axial direction, and being supported by a second support part of the plate-shaped support member such that light from the first mirror is reflected toward the rotating mirror of the MEMS optical deflector,
wherein at least one support part out of the first support part and the second support part includes a rotating mechanism which rotatably supports one mirror out of the first mirror and the second mirror supported by the one support part, and a fixing member which fixes a rotational position of the one mirror in the rotating mechanism.

2. The optical scanning device according to claim 1, wherein:

the rotating mechanism has a through hole in which one end portion of the one mirror is inserted and supported, and the through hole has a shape of a rotating body having an axis in the second axial direction as a centerline thereof.

3. The optical scanning device according to claim 1, wherein the fixing member includes an adhesive.

4. The optical scanning device according to claim 2, wherein:

the through hole is shaped in a cylinder, or a truncated cone that gradually narrows toward an end of insertion of one end portion of the one mirror, and the one support part and the one end portion supported by the one support part are bonded to each other.

5. The optical scanning device according to claim 1, wherein:

the one support part is the second support part, the first support part has an inclined surface formed on the plate-shaped support member, and one end portion of the first mirror is bonded to the inclined surface such that the first mirror reflects incoming light from the surface-emitting laser element in parallel to the first axial direction.

6. The optical scanning device according to claim 1, wherein the rotating mirror is placed on an opposite side from the first mirror with respect to the second mirror in the first axial direction, and reflects light from the second mirror to an opposite side from the second mirror in the first axial direction at a tilt angle inclined with respect to the substrate.

7. The optical scanning device according to claim 2, wherein the fixing member includes an adhesive.

8. The optical scanning device according to claim 7, wherein:

the through hole is shaped in a cylinder, or a truncated cone that gradually narrows toward an end of insertion of one end portion of the one mirror, and the one support part and the one end portion supported by the one support part are bonded to each other.

9. The optical scanning device according to claim 8, wherein:

the one support part is the second support part, the first support part has an inclined surface formed on the plate-shaped support member, and one end portion of the first mirror is bonded to the inclined surface such that the first mirror reflects incoming light from the surface-emitting laser element in parallel to the first axial direction.

10. The optical scanning device according to claim 9, wherein the rotating mirror is placed on an opposite side from the first mirror with respect to the second mirror in the first axial direction, and reflects light from the second mirror to an opposite side from the second mirror in the first axial direction at a tilt angle inclined with respect to the substrate.

11. The optical scanning device according to claim 4, wherein:

the one support part is the second support part, the first support part has an inclined surface formed on the plate-shaped support member, and one end portion of the first mirror is bonded to the inclined surface such that the first mirror reflects incoming light from the surface-emitting laser element in parallel to the first axial direction.

12. The optical scanning device according to claim 11, wherein the rotating mirror is placed on an opposite side from the first mirror with respect to the second mirror in the first axial direction, and reflects light from the second mirror to an opposite side from the second mirror in the first axial direction at a tilt angle inclined with respect to the substrate.

* * * * *